Patented July 14, 1925.

1,546,048

UNITED STATES PATENT OFFICE.

HEINRICH VOGEL, OF PREMNITZ, NEAR RATHENOW, GERMANY.

PROCESS FOR THE PRODUCTION OF COLLOIDAL SULPHUR.

No Drawing. Application filed June 1, 1923. Serial No. 642,859.

*To all whom it may concern:*

Be it known that I, HEINRICH VOGEL, subject of the German Republic, residing at Premnitz, near Rathenow, Westhavelland, Germany, have invented certain new and useful Improvements in Processes for the Production of Colloidal Sulphur, of which the following is a specification.

This invention relates to an improved process for the production of colloidal sulphur. Various proposals have been made for the production of colloidal sulphur according to which watery brine of not too high concentration and more or less high dispersity can be produced. The size of the particles of all these solutions can easily be accurately ascertained by the ultra-microscope. In order on the one hand to increase the action of the sulphur as far as possible and on the other hand to produce solutions of the highest possible concentration, it is necessary to attain a very minute size of particles. It has now been ascertained that solutions of extremely fine dispersion, the particles of which are completely a microscopic, can be obtained in concentrations of 20 to 30%, if the process is carried out in the following manner: Into water mixed with the usual protective colloids and contained in a reaction vessel sulphur dioxide and sulphuretted hydrogen are simultaneously introduced in the well-known manner. A colloidal sulphur solution is hereby produced the size of the particles and the concentration of which depends upon the temperature prevailing in the reaction vessel. The size of the particles greatly decreases when the temperature falls and in the degree of its decrease it is possible to increase the concentration in sulphur. If the process is carried through at temperatures $-3°$ up to $+4°$ C. a brine of a size below 25 $\mu\mu$ is attained. Preferably an excess of sulphuretted hydrogen is employed in this process, as the yield in colloidal sulphur increases with increasing concentration of sulphuretted hydrogen, while simultaneously the quantity of the polythione acids generated during the conversion decreases equally strongly. In this manner highly dispersed sulphur solutions up to 40% may be produced.

Preferably the sulphur dioxide and the sulphuretted hydrogen are employed in the state of finest division and the water is agitated during the introduction so as to produce this fine division. To avoid the oxidation of the finished solution it should be stored saturated with sulphuretted hydrogen in closed receptacles.

It will be understood that I do not limit myself to any particular proportions of the chemicals employed or to any details in the process, but what I claim as my invention and desire to secure by Letters Patent is:—

1. Process for the production of highly dispersed colloidal sulphur solutions, which consists in introducing sulphur dioxide and an excess of sulphuretted hydrogen simultaneously into water contained in a reaction vessel.

2. Process for the production of highly dispersed colloidal sulphur solutions, which consists in introducing sulphur dioxide and an excess of sulphuretted hydrogen simultaneously into water contained in a cooled reaction vessel and agitating said water.

3. Process for the production of highly dispersed colloidal sulphur solutions, which consists in introducing sulphur dioxide and an excess of sulphuretted hydrogen simultaneously into water contained in a reaction vessel and storing the finished solution saturated with sulphuretted hydrogen in closed receptacles.

4. Process for the production of highly dispersed colloidal sulphur solutions, comprising introducing sulphur dioxide and sulphuretted hydrogen simultaneously into water mixed with a protective colloid and contained in a reaction vessel.

5. Process for the production of highly dispersed colloidal sulphur solutions, comprising introducing sulphur dioxide and sulphuretted hydrogen in a state of finest possible division simultaneously into water mixed with a protective colloid contained in a reaction vessel.

6. Process for the production of highly dispersed colloidal sulphur solutions, comprising introducing sulphur dioxide and sulphuretted hydrogen in a state of finest possible division, simultaneously into water contained in a reaction vessel cooled to from $-3°$ to $+4°$ C.

In testimony whereof I have signed my name to this specification.

HEINRICH VOGEL.